(12) United States Patent
Hull

(10) Patent No.: US 6,169,352 B1
(45) Date of Patent: *Jan. 2, 2001

(54) TRAPPED FIELD INTERNAL DIPOLE SUPERCONDUCTING MOTOR GENERATOR

(75) Inventor: John R. Hull, Downers Grove, IL (US)

(73) Assignee: University of Chicago

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/898,478

(22) Filed: Jul. 21, 1997

(51) Int. Cl.$^7$ ..................................................... H02K 1/22
(52) U.S. Cl. ........................................... 310/261; 310/90.5
(58) Field of Search ............................. 310/90.5; 505/166

(56) References Cited

U.S. PATENT DOCUMENTS 4,086,508 * 4/1978 Masumoto et al. .................... 310/86
5,479,059 * 12/1995 Weinberger .......................... 310/90.5

* cited by examiner

Primary Examiner—Elvin Enad
(74) Attorney, Agent, or Firm—Michael D. Rechtin; Foley & Lardner

(57) ABSTRACT

A motor generator including a high temperature superconductor rotor and an internally disposed coil assembly. The motor generator superconductor rotor is constructed of a plurality of superconductor elements magnetized to produce a dipole field. The coil assembly can be either a conventional conductor or a high temperature superconductor. The superconductor rotor elements include a magnetization direction and c-axis for the crystals of the elements and which is oriented along the magnetization direction.

19 Claims, 6 Drawing Sheets

TRAPPED FIELD INTERNAL DIPOLE SUPERCONDUCTING MOTOR GENERATOR

CONTRACTUAL ORIGIN OF THE INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

The present invention relates generally to a superconducting motor generator. More particularly, the invention relates to a motor generator having a high temperature superconductor rotor comprised of segments of high temperature superconductor material and in selected embodiments, the stator can include a coil composed of high temperature superconductor material.

The efficiency and power of conventional motor generator systems are quite low. In addition, the demagnetization is very inefficient in conventional permanent magnet systems because an entire domain must be switched. Furthermore, magnetic fields present in a conventional motor generator cannot be too large or demagnetization takes place very readily. Such low field sensitivity drastically limits the applications and efficiency of conventional motor generators. Further, conventional motor generators can be constructed to have an internal-dipole with an arrangement of magnetized permanent magnets disposed around the perimeter of a circle to create an internal dipole magnetic field. However, such systems are difficult to energize because the magnetic field arising from the permanent magnets can be removed only by raising the temperature to almost 100° C., which is quite a slow process. Typically, such magnetic arrays are constructed with the magnetic pieces already magnetized.

It is therefore an object of the invention to provide an improved motor generator.

It is another object of the invention to provide a novel superconducting motor generator.

It is a further object of the invention to provide an improved motor generator having a superconducting rotor.

It is also an object of the invention to provide a novel motor generator having a superconducting stator.

It is yet another object of the invention to provide an improved motor generator having a multipole stator of superconducting material.

It is an additional object of the invention to provide a novel motor generator having a superconducting rotor composed of a plurality of superconductor segments having each segment's c-axis oriented to optimize magnetization efficiency.

It is yet a further object of the invention to provide an improved motor generator having a rotor composed of a magnetized high temperature superconductor with substantially uniform current density therein.

It is still another object of the invention to provide a novel motor generator having a rotor composed of a high temperature superconductor rotor with a magnetization along the c-axis direction of the superconductor material.

It is also another object of the invention to provide an improved motor generator having a stator composed of a high temperature superconductor which can withstand large magnetic fields without demagnetization of the rotor.

Other advantages and features of the invention, together with the organization and the manner of operation thereof, will become apparent from the detailed description when taken in conjunction with the accompanying drawings, wherein like elements have like numerals throughout the drawings.

DETAILED DESCRIPTION OF PREFERRED EMBODIMENTS

Figure 1:
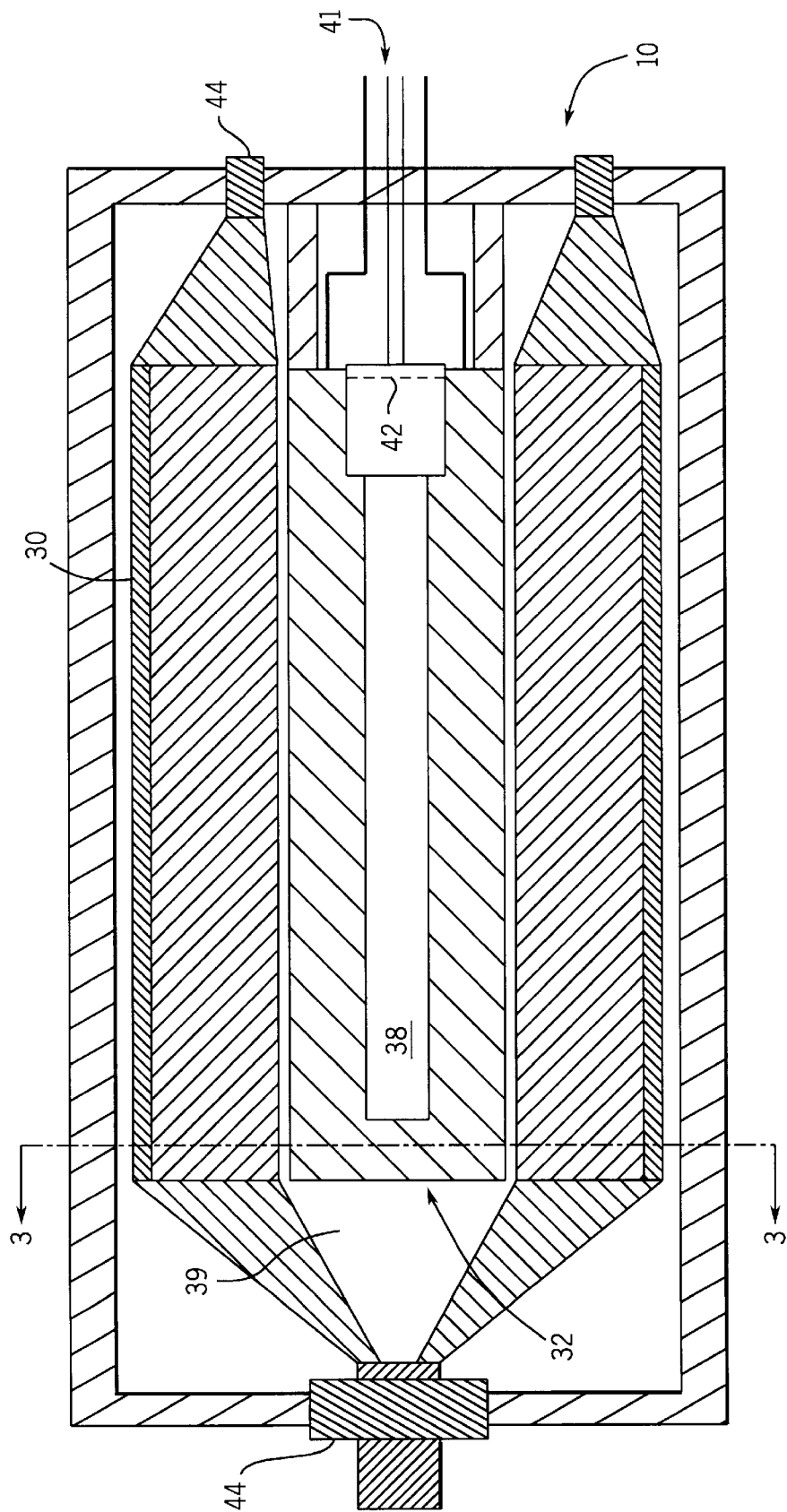
FIG. 1 illustrates a side view of a motor generator constructed in accordance with one form of the invention.
Figure 2:
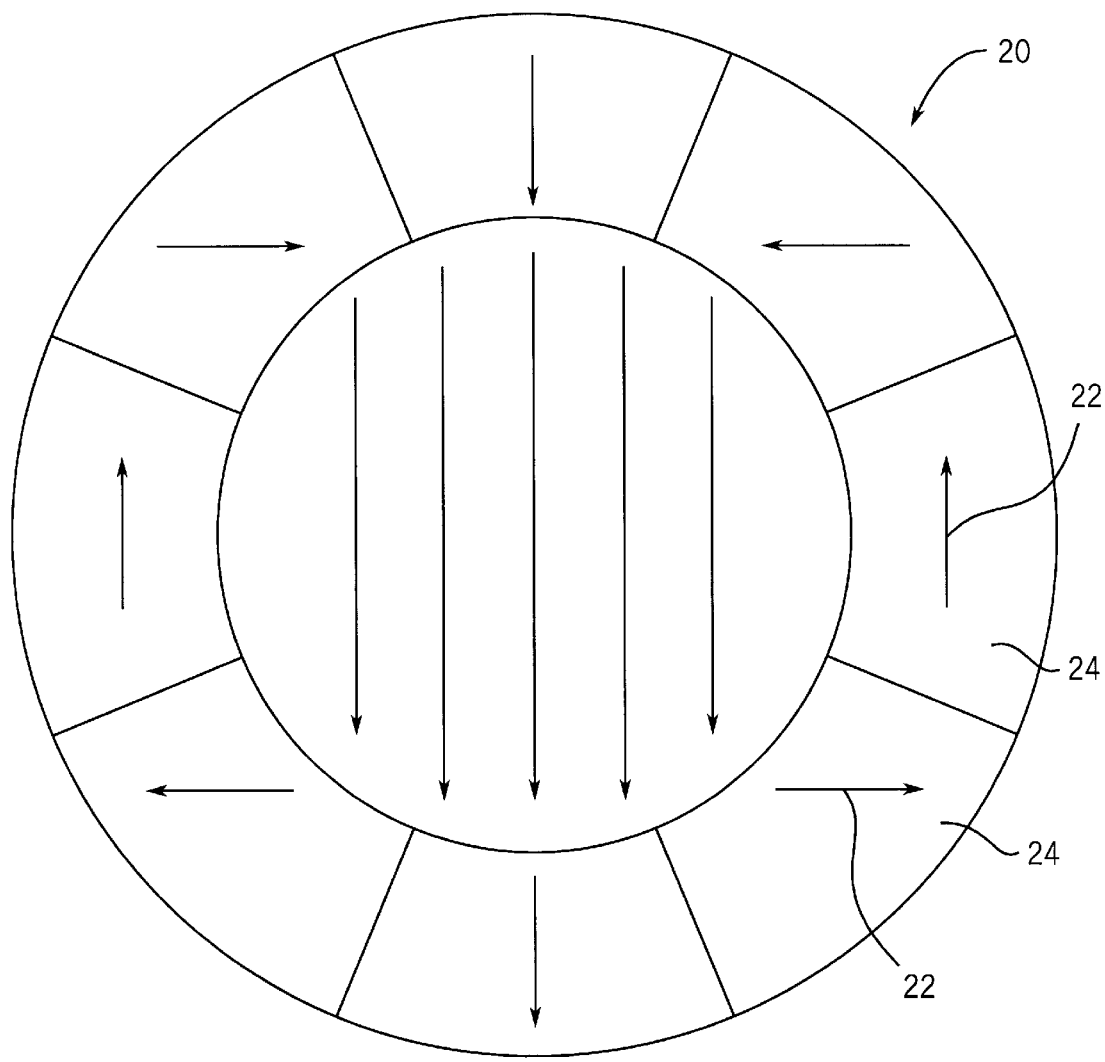
FIG. 2 illustrates a prior art Halbach array internal dipole magnet system.

A motor generator 10 constructed in accordance with one form of the invention is shown in FIG. 1. The concept of an internal dipole, or Halbach array, motor generator is known in the art and is shown as motor generator 20 in the transverse cross section in FIG. 2. Magnetizations 22 of permanent magnets 24 are arranged around the perimeter of a circle to create an internal dipole magnetic field. In the invention of FIG. 1 the permanent magnets 24 of the prior art motor generator 20 of FIG. 2 are replaced by high temperature superconductor segments 26. These high temperature superconductor segments 26 are preferably a melt textured YBCO, but can be any high temperature superconductor material capable of trapping a magnetic field. Each of the superconductor segments 26 also preferably has it c-axis oriented in the direction of arrows 28 representing the magnetization. Upon application of an external magnetic field to the superconductor segments 26, these segments 26 will tend to magnetize along the direction of the c-axis.

In the preferred embodiment there is also a soft-magnetic, high mechanical strength shell 30 disposed around the superconductor segments 26. This shell 30 can be constructed of a low carbon steel or other appropriate material to help confine the magnetic flux and act as a mechanical band to contain the relatively low mechanical strength, brittle ceramic material making up the superconductor segments 26. This shell 30 is of particular importance during operation of the motor generator 20 while rotating the superconductor segments 26.

Figure 3:
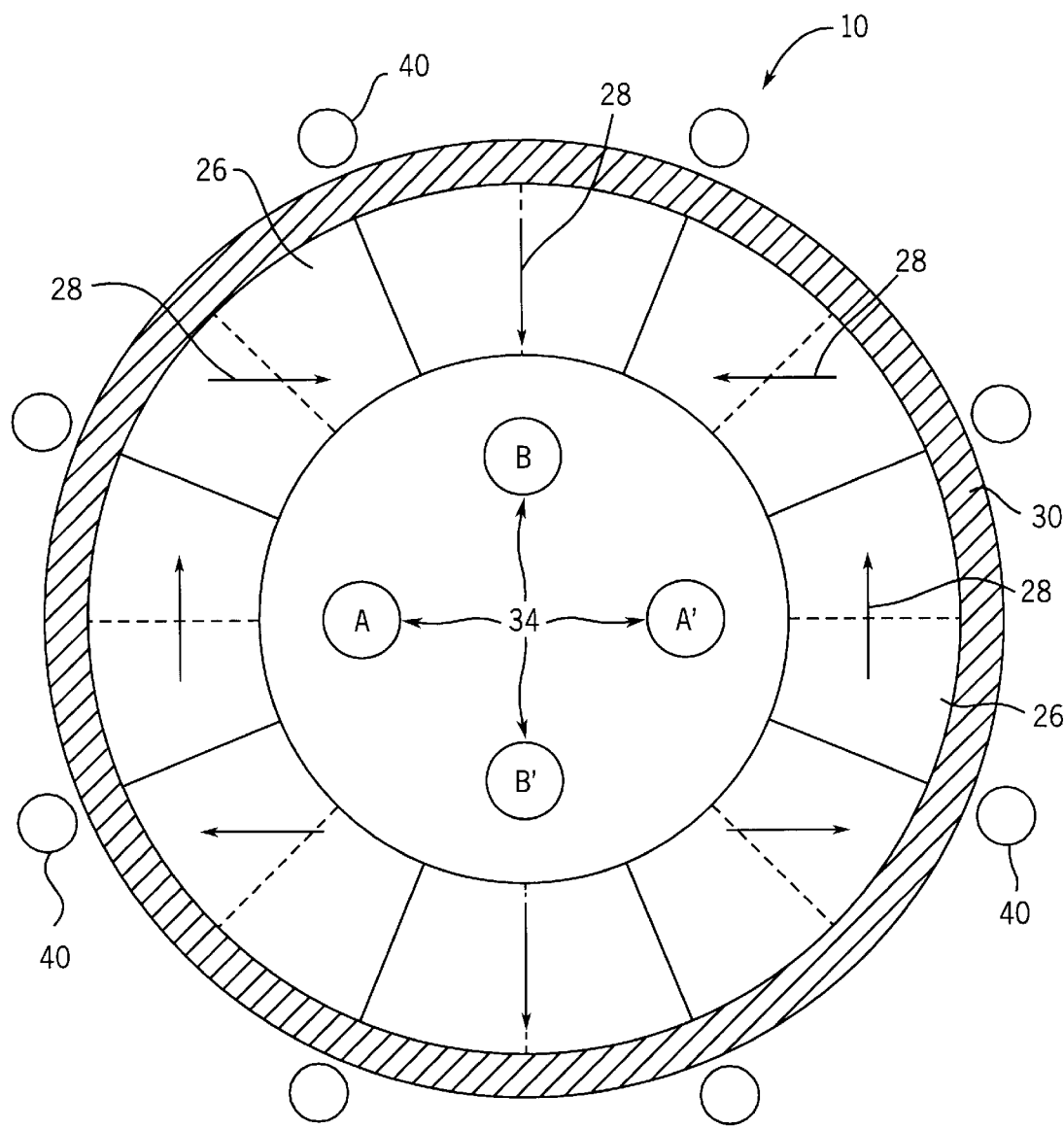
FIG. 3 illustrates a cross-sectional view along 3—3 in FIG. 1 showing magnetization in each high temperature superconductor segment.
Figure 4:
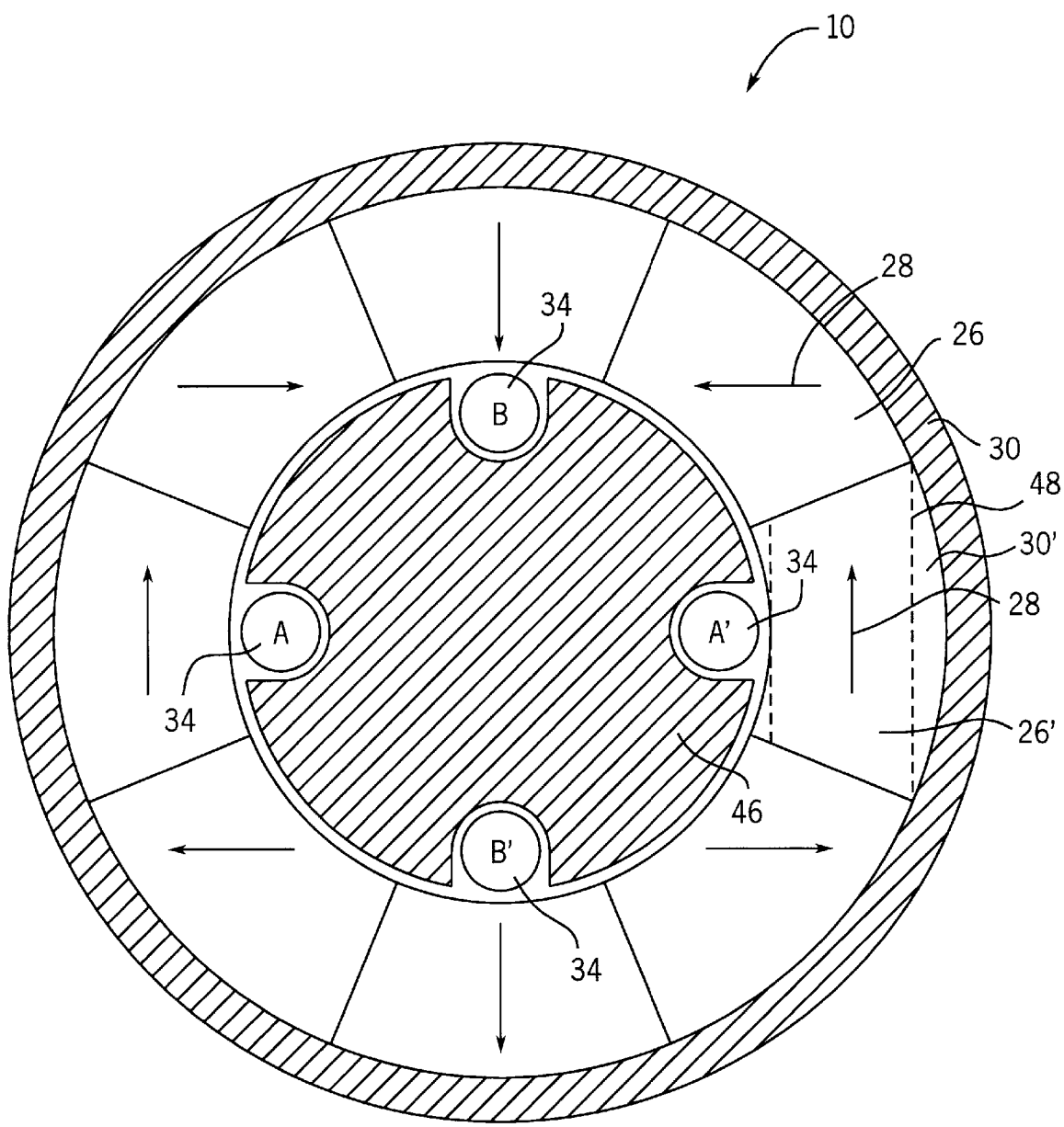
FIG. 4 illustrates another form of the embodiment of FIG. 3 which includes an iron core for the stator.

A stator 32 (FIG. 1) is comprised of a plurality of stator coils 34 shown in FIGS. 3 and 4. In FIG. 3, a two phase coil arrangement is shown with a first phase of A—A' for one of the stator coils 34 and a second phase of B—B' for another of the stator coils 34. These stator coils 34 can be energized to provide a torque to the motor generator 10. Consequently, when current is coming out of the page in B and goes into the page in B', there is a clockwise torque on the stator coil 34 and an equal counterclockwise torque on the shell 30. Upon rotating the shell 30 by 180°, the stator coils 34 are energized with the opposite polarity.

For the stator coil 34 of phase A—A' when it is energized as the shell 30 rotates slightly, the coil A—A' is energized and begins to produce a torque in the manner of the stator coil 34 of phase B—B'. To produce a rotating magnetic field by the stator coils 34, A—A' can be energized 90° out of phase relative to B—B'. Each of the stator coils 34 can be made up of one or a plurality of turns depending on the desired performance from the coils 34. In general, the stator 32 can be comprised of only one phase or can be a plurality of phases. Electrical voltage generation can be achieved by rotating the shell 30 and connecting the stator coils 34 to a load (not shown).

Operation of the motor generator 10 shown in FIGS. 1 and 3 and 4 includes cooling the superconductor segments 26 to their superconducting state in the absence of an applied magnetic field and no current in the stator coils 34. This cooling can be achieved by a variety of well know means, including, for example, a conventional refrigerator cold head 38 shown in FIG. 1. Other means can include fluid cryogens 39, such as liquid nitrogen, or one can even use cold gases as shown in FIG. 1 and be applied to be in thermal contact with the superconductor segments 26 (see FIGS. 3 and 4).

In order to magnetize the superconductor segments 26 after being cooled to their superconducting state, the shell 30 can be held stationary, and the superconductor segments 26 can be magnetized by passing electrical current from electrical power input 41 (see FIG. 1) through the stator coil 34 of phase A—A', for example as shown in FIGS. 3 and 4. The stator coil 34 then forms a magnetic field which is an approximation to the dipole field, and this magnetic field will be impressed upon the superconductor segments 26, thereby magnetizing them. The surrounding shell 30 assists in shaping the magnetic field through the superconductor segments 26. Magnetization of these superconductor segments 26 typically occurs by application of a large current over a short time period, such as milliseconds time duration.

In another operational mode for the motor generator 10, the stator coil 34 can be cooled into the superconducting state, then one of the phases (such as A—A' or B—B') can be activated in a DC mode, the superconductor segments 26 are cooled in the shell 30 and the stator coil 34 is deactivated. In this situation, a portion of an originally applied magnetic field will remain in the superconductor segments 26. External coils 40 shown in FIG. 3 can also be used to help achieve the original level of applied magnetization.

In another form of the invention, slip rings 42 (shown in phantom in FIG. 1) can be used on the stator coils 34, and in such a structure the superconductor segments 26 remain fixed and the stator coils 34 rotate.

In the embodiment shown in FIG. 3, there is shown eight superconductor segments 26, but a larger number of these segments 26 can be used for achieving other effects. For example, as shown in phantom in FIG. 3, additional ones of the segments 26 can be provided to achieve a more uniform dipole field. As shown in FIG. 3, there are now sixteen of the segments 26. In other aspects of the invention, the magnetizations can be configured so that the magnetic field is that of a quadrapole, as opposed to a dipole.

In the embodiment shown in FIG. 1 the stator coils 34 are composed of high temperature superconductor material, and there is very little lateral force applied on bearings 44. In another arrangement shown in FIG. 4, the stator coils 34 are embedded in an iron yoke 46 which acts as a low reluctance magnetic flux path. The stator coils 34 are composed of conductor material which can be the high temperature superconductor material or a normal conductor, such as copper. When using such a configuration with the iron yoke 46, a much larger lateral force is created between the stator coils 34 and the shell 30. This larger force must therefore be accommodated by the bearings 44.

While the embodiments of FIGS. 3 and 4 show the superconductor segments 26 as arc-shaped elements, the segments can, in an alternate embodiment, also be shaped as trapezoids so that the segments 26 take the form of an octagon (shown as segments 26' in phantom in FIG. 4) with little effect on the quality of the resulting dipole field. When using these trapezoid segments 26', region 30' also becomes steel as part of the steel shell 30. With this structural arrangement, inner surface 48 of the shell 30' would be machined to accommodate the flat surfaces of the trapezoidal-shaped superconductor segments 26'.

Figure 5:
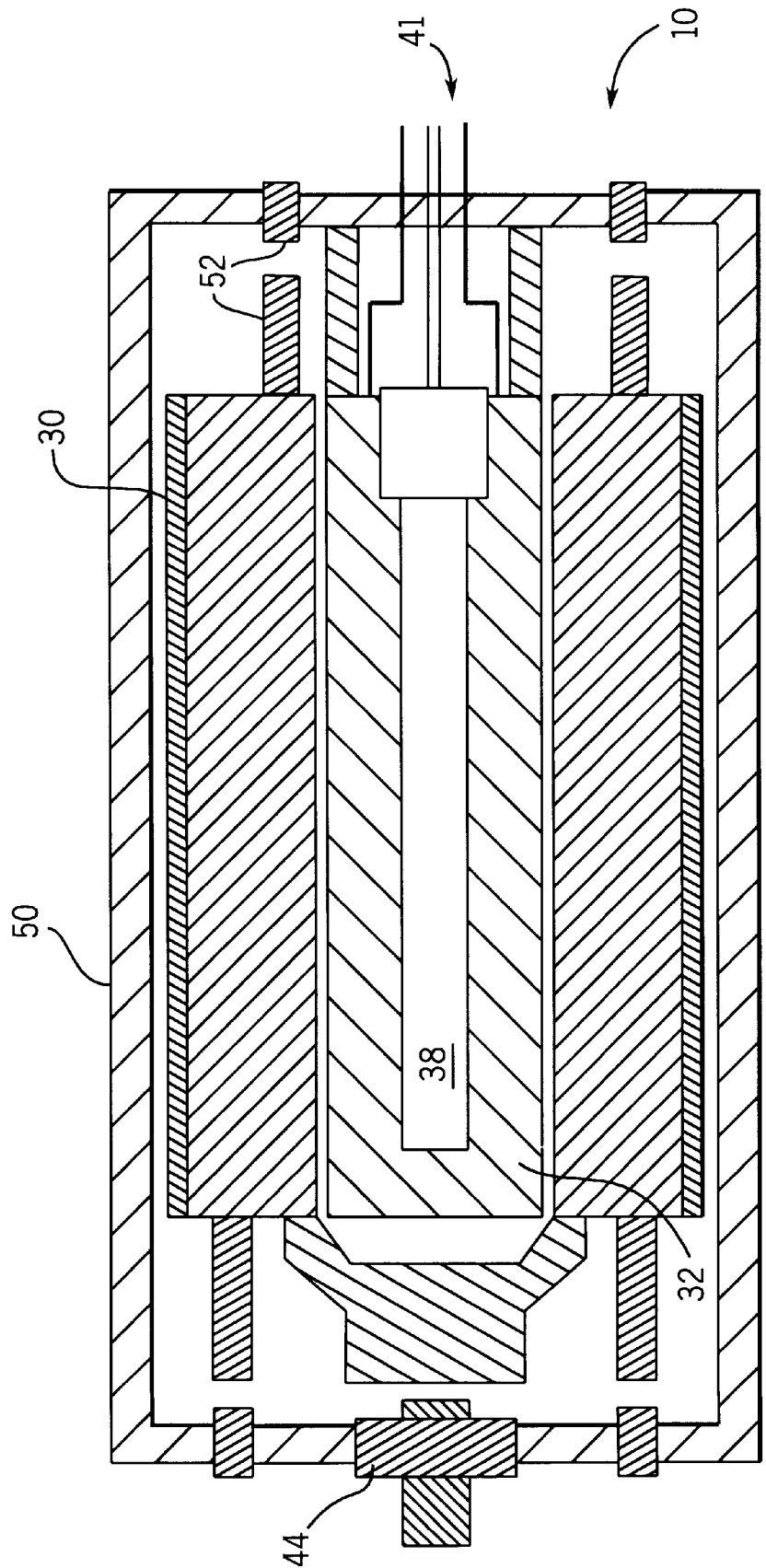
FIG. 5 illustrates a variation on the embodiment of FIG. 1 with magnetic bearings and torque coupler.

In another embodiment shown in FIG. 5, it is also possible to operate the motor generator 10 at high speeds by evacuating an enclosed space 50 surrounding the motor generator 10. In FIG. 5, the shell 30 can be suspended with magnetic bearings 52. In such a preferred structure, the motor generator 10 includes a magnetic torque coupler 54, and the shell 30 can be cooled by radiative exchange between the stator coils 34 and the shell 30.

Figure 6A:
FIG. 6A illustrates a portion of a superconductor segment composed of a superconductor film on a substrate and FIG. 6B illustrates a superconductor segment composed of a stack of superconductor films.
Figure 6B:
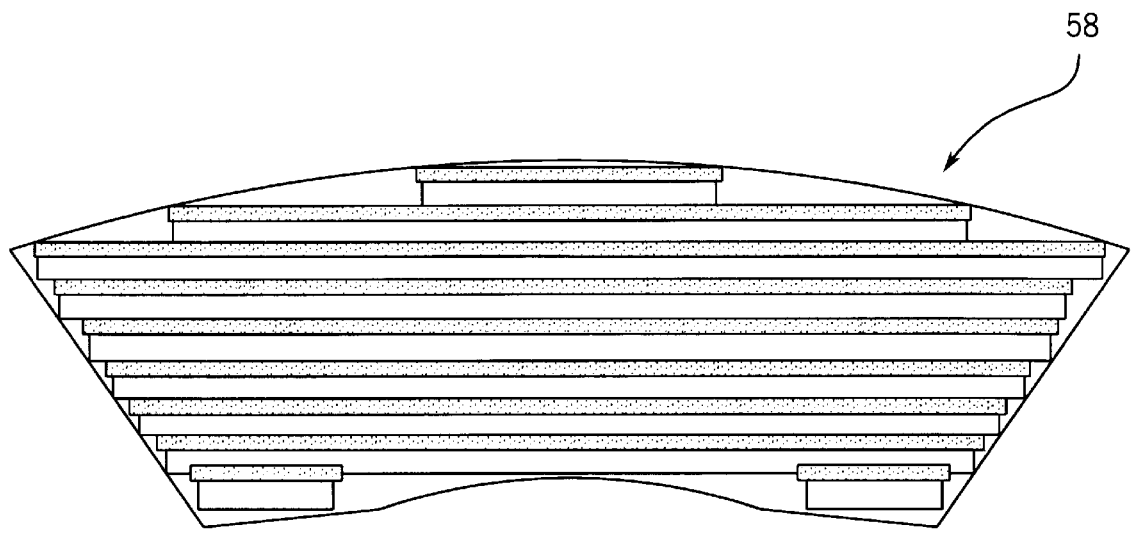

In another aspect of the invention shown in FIGS. 6A and 6B, the segments 26 can be constructed of high temperature superconductor films 56 (FIG. 6A) on a substate 57 forming a stack 58 (FIG. 6B) with the c-axis of the superconductor films 56 aligned in the direction of magnetization.

The motor generator 10 therefore advantageously provides a high specific torque such that a very small motor can be used relative to a conventional motor generator of the same output and efficiency. Further, the demagnetization character of the high temperature superconductor segments 26 occurs at the individual atomic level and thus will allow more efficient changeover of magnetic domains compared to conventional systems which require overcoming the force needed to switch an entire macroscopic domain. Moreover, by using high temperature superconductor material for creating an internal dipole field, the motor generator 10 can be readily de-energized as compared to conventional permanent magnets requiring slow thermal de-energization.

While the principles of this invention have been described in connection with specific embodiments, it should be understood clearly that these descriptions are added only by way of example and are not intended to limit, in any way, the scope of the invention. Other advantages and features will become apparent from the claims hereinafter, with the scope of the claims determined by the reasonable equivalents, as understood by those skilled in the art.

What is claimed is:

1. A motor generator, comprising:
   a rotor comprised of a plurality of high temperature superconductor elements magnetized such that a dipole magnetic field is produced, each of said high temperature superconductor elements including a magnetization direction and a crystallographic c-axis for crystals which form each of said elements being oriented substantially along the magnetization direction; and
   a coil assembly disposed at least partially within said rotor, said coil assembly selected from the group consisting of a conventional conductor and a high temperature superconductor.

2. The motor generator as defined in claim 1 wherein each of said high temperature superconductor elements includes a magnetization direction and a crystallographic c-axis for crystals of said elements and which is oriented substantially along the magnetization direction.

3. The motor generator as defined in claim 1 further including an external shell disposed around said rotor.

4. The motor generator as defined in claim 3 wherein said external shell comprises a soft magnetic material.

5. The motor generator as defined in claim 1 wherein said high temperature superconductor elements comprise arc shaped components.

6. The motor generator as defined in claim 1 wherein said high temperature superconductor elements comprise separate trapezoidal components.

7. The motor generator as defined in claim 1 wherein said high temperature superconductor elements comprise stacked films of superconductors.

8. The motor generator as defined in claim 1 wherein said high temperature superconductor elements comprise a superconductor material capable of trapping a magnetic field.

9. The motor generator as defined in claim 1 wherein said coil assembly comprises a plurality of pairs of stator coils.

10. The motor generator as defined in claim 9 wherein each of said pair of coils has an associated phase.

11. The motor generator as defined in claim 10 wherein each of said pair of coils is energized when said rotor rotates by 360°/n where n is the number of said pair of coils.

12. The motor generator as defined in claim 1 wherein said coil assembly is connected to a load, thereby generating electric voltage.

13. The motor generator as defined in claim 1 further including an iron yoke disposed in association with said coil assembly for providing a low reluctance flux path.

14. A motor generator, comprising:

a rotor comprised of a plurality of high temperature superconductor elements magnetized to produce a multipole magnetic field, said elements having a magnetization direction rotated by equal amounts proceeding from one of said superconductor elements to an adjacent one of said elements and each of said superconductor elements further having crystals with a crystallographic c-axis oriented substantially along the magnetization direction within each of said elements; and a coil assembly disposed at least partially within said rotor, said coil assembly including means for causing flow of electrical current therethrough to induce said multipole magnetic field within said rotor.

15. The motor generator as defined in claim 14 further including means for cooling said high temperature superconductor elements.

16. The motor generator as defined in claim 14 further including an externally disposed coil assembly for imposing magnetization on said high temperature superconductor elements.

17. The motor generator as defined in claim 14 wherein said high temperature superconductor elements comprise at least one of arc shaped components, stacked films of superconductor and trapezoidal components.

18. The motor generator as defined in claim 14 wherein said high temperature superconductor elements comprise a superconductor material capable of trapping a magnetic field.

19. A motor generator, comprising:

a rotor comprised of a plurality of high temperature superconductor elements magnetized to produce a multipole magnetic field, said elements having a magnetization direction rotated by equal amounts proceeding from one of said superconductor elements to an adjacent one of said elements;

a coil assembly disposed at least partially within said rotor, said coil assembly including means for causing flow of electrical current therethrough to induce said multipole magnetic field within said rotor; and an external shell of soft magnetic materials disposed around and in contact with said rotor of high temperature superconductor elements.

* * * * *